(No Model.) 2 Sheets—Sheet 1.

G. W. ELLIOTT.
DISINTEGRATOR.

No. 457,709. Patented Aug. 11, 1891.

FIG. I.

Witnesses
N. A. Kennedy
W. W. Mortimer

Inventor
G. W. Elliott
By Phil. T. Dodge Atty (No Model.) 2 Sheets—Sheet 2.

G. W. ELLIOTT.
DISINTEGRATOR.

No. 457,709. Patented Aug. 11, 1891.

FIG. 4ª

Witnesses
N. R. Kennedy
W. W. Mortimer

Inventor
G. W. Elliott
By his Atty
Phil T. Dodge

UNITED STATES PATENT OFFICE.

GEORGE WILLIAM ELLIOTT, OF SHEFFIELD, ENGLAND.

DISINTEGRATOR.

SPECIFICATION forming part of Letters Patent No. 457,709, dated August 11, 1891.

Application filed September 11, 1890. Serial No. 364,597. (No model.)

*To all whom it may concern:*

Be it known that I, GEORGE WILLIAM ELLIOTT, engineer, a subject of the Queen of Great Britain, residing at Sheffield, in the county of York, in the Kingdom of England, have invented certain new and useful Improvements in Disintegrators, of which the following is a specification.

In those kinds of disintegrators known as "devil" disintegrators or vertical disk-mills several disadvantages are found. In the first place, the opening to the disk is usually very small, owing to the fact that so large an amount of space is occupied by the bearings of the shaft on each side; secondly, the teeth of the disk-mill very quickly wear out, and long before they are worn down to their bases they are nearly useless, owing to there not being enough vacant space for the material to get in between them. Now my invention is designed for the purpose of obviating these evils. It is best described by the aid of the accompanying drawings, in which—

Figure 1:
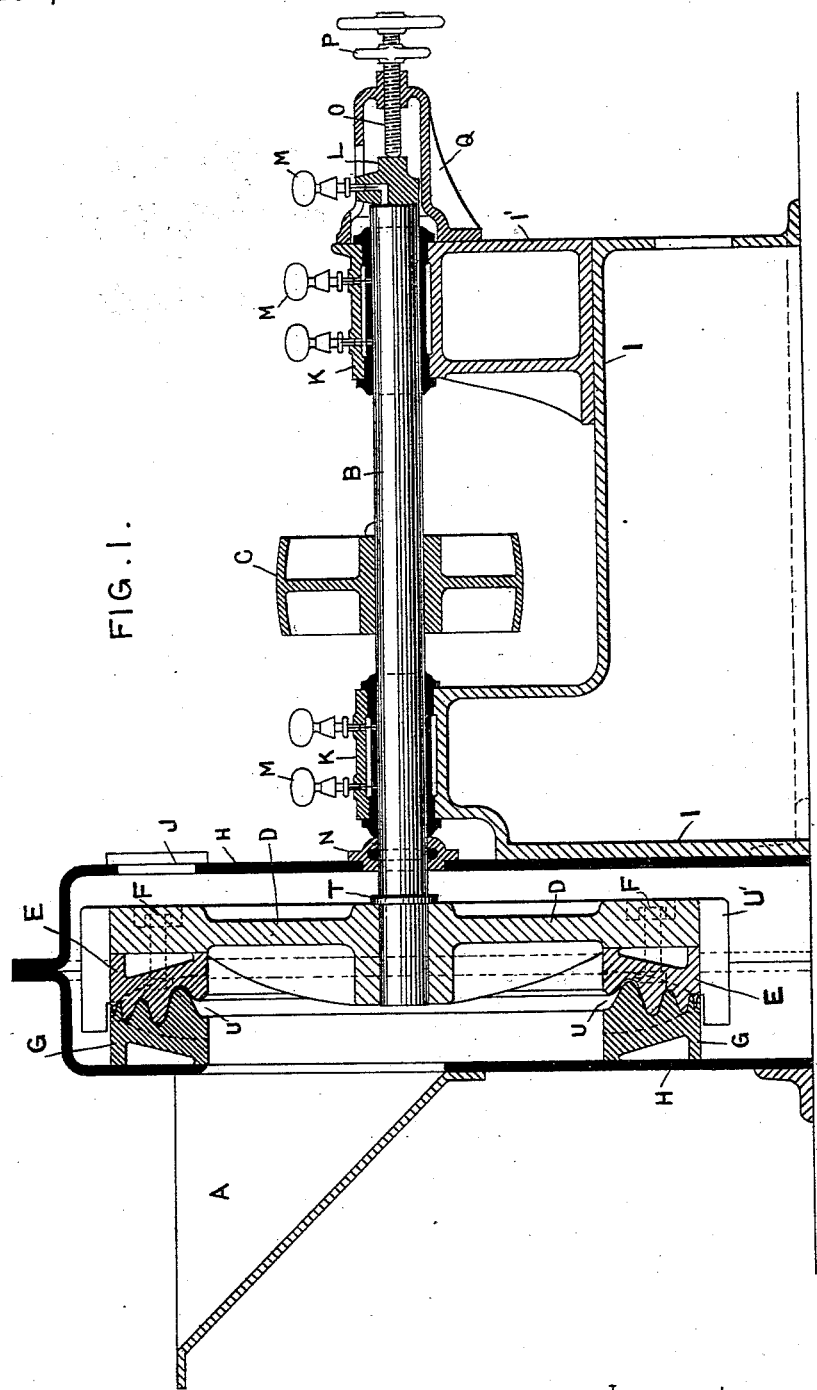
Figure 2:
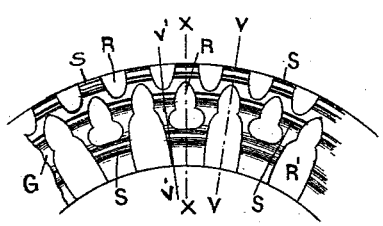
Figures 3, 4:
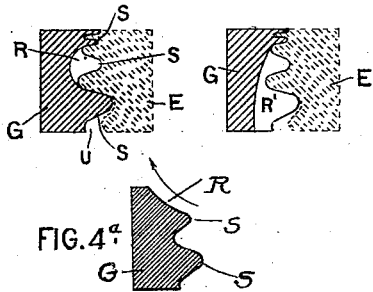
Figure 5:
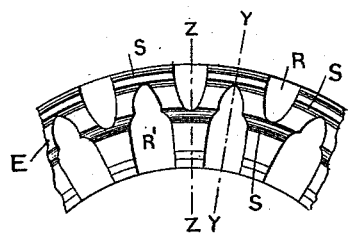
Figures 6, 7:
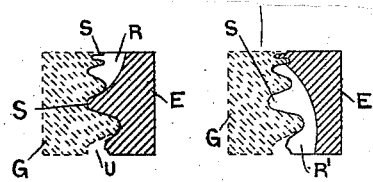
Figure 8:
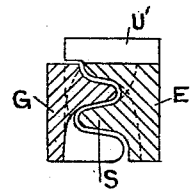

Figure 1 is a sectional elevation of the machine; Fig. 2, a face view of the corrugations or teeth on the stationary disk. Figs. 3, 4, and 4ª are cross-sections through this disk at lines X X, V V, and V' V', respectively, the opposing disk also being shown in dotted lines; Figs. 5, 6, and 7, corresponding views of the moving disk, the sections being taken through lines Z Z and Y Y, respectively; Fig. 8, section of disks specially used for pulverizing coal.

Referring now chiefly to Fig. 1, A is the hopper, into which the material to be ground is inserted. B is a shaft, carrying driving-pulley C and the base-plate D of the revolving face or annular disk E. The pulley C and the foundation-plate D are firmly keyed to shaft B, and the foundation-plate D is still further secured from shifting on shaft B by means of turned collar T on said shaft B, and the disk E is attached to foundation-plate D by means of bolts F F. G is a stationary disk, supported on casing H and attached by means of bolts or otherwise. H is a casing of strong cast-iron or steel attached to frame-work I and carrying the disk G. A man-hole J in this casing is arranged so that the nuts of bolts F can be tightened up as required. Casing H thus performs the double purpose of a casing to prevent the escape of dust and a frame-work to support the stationary disk G and hopper A. The shaft B is supported on two bearings K K, and also by a terminal foot-step or thrust-block L. These bearings preferably run in oil or are well lubricated by lubricators M M. In order to prevent the dust from the casing getting to the bearing, I place a hollow bearing N on the casing, acting as a gland to keep the dust in. This can be packed with a piece of spun yarn or any other suitable material. O is a screw, preferably with a set-nut P, by which the position of the shaft, and consequently the distance between the two jaws or disks G and E, can be exactly regulated. The screw O works in bearings in brackets Q, which again is supported firmly on frame-work I', which again is supported on frame-work I. The advantage of this arrangement is that the bearings are both on one side of the disk. Consequently the hopper A can open out into the disk G to any extent that is desired, instead of there being only a very small opening, as is usually the case above the bearing.

Figs. 2 to 7, inclusive, show my arrangement of jaws or cutting-disks, Figs. 2, 3, and 4 representing the stationary disk, Figs. 5, 6, and 7 the other one; but in each instance in the sections the opposing disk is shown in dots. In these R R' are pockets or recesses cut away below the level of the bases of the teeth—in fact cut away as far as is possible without injuring unduly the strength and stability of the casting. S S are teeth formed of ring projections cut away at intervals where the pockets or recesses R R' are found. U is a vacant space between the two rings, gradually lessening in size toward the periphery. This space is useful to enable the material more easily to enter the pockets or recesses R'. The advantage of this arrangement is that material can very easily enter through the deep recesses R' and U; also that these recesses, together with the pockets or recesses marked R, being very much deeper than the bases of the teeth, the mill can go on working for a very much longer time, as the comparatively thin webs forming the teeth between these recesses or pockets wear down nearly as much at their lowest points as at their highest, and consequently, even when a large portion of the original teeth is worn away, the teeth still have approximately the same form and depth, the pockets or recesses only being a little shallow.

Fig. 8 shows a special modification used for pulverizing coal and other minerals. The teeth are about four inches long and about two inches thick and four inches wide. For cutting coal the two disks are separated by a space from half an inch to an inch wide. The teeth are, therefore, more strictly beaters used to break up the brittle material by percussion only. U' are scrapers used to clear the outside of the disks when very adhesive coal or minerals are to be pulverized. It will be seen from the foregoing that my mill is for a totally different purpose and works in a different way to the dresses of flour mills, and ought not to be confounded in any way with these latter.

Referring back again to the cutting-disks, the recesses or pockets R and R' in no case cut through all the rows of teeth. Consequently there is no clear run outward for the material; but every particle entering the recesses R' must come in contact with the teeth, unless it be so small that it can pass through the space (usually about half an inch) separating the outer part of the two disks from each other. If, however, these recesses R and R' were only cut level with the bases of the teeth, long before the teeth were worn down the mill would be almost useless through the great difficulty that would be experienced by the material in getting in between the cutting-disks at all.

I declare that what I claim is—

1. The combination, in the cutting-disks G and E, of the teeth S S, with the pockets or recesses R' R, cut to a depth much below the bases of teeth S, substantially as and for the purpose described.

2. The combination, in the pair of cutting-disks, such as G and E, of a series of rings of teeth S on each disk registering with each other, but having spaces R R' cut out at intervals to a depth considerably below the bases of the teeth, but none of them cutting through all the rows of teeth, and the spaces R' near the inner edge of the disk cut deeper toward the inner periphery, in combination with a space U between the two disks near their inner periphery, whereby material can be more easily caused to enter between the disks.

3. In a pair of cutting-rings, such as G or E, a series of rings of teeth on each cutting-ring registering the one with the other, the said rings of teeth being formed of single turned ridges and the teeth formed from these ridges by radial and substantially vertically-sided cuts through these ridges, the cuts in each ridge coming opposite to uncut portions of the contiguous ridges, whereby a concussive action is produced on materials fed between the cutting-rings, and the teeth can be made self-sharpening by reversing the direction of the motion as the edges become dull.

In testimony whereof I have signed my name to this specification in the presence of two subscribing witnesses.

GEORGE WILLIAM ELLIOTT.

Witnesses:
WM. THOS. COOPER,
G. E. GILLOTT.